United States Patent [19]

Sato et al.

[11] 4,191,286
[45] Mar. 4, 1980

[54] APPARATUS FOR TRANSPORTING CYLINDRICAL STEEL ARTICLES

[75] Inventors: Katsutoshi Sato; Susumu Ito, both of Hitachi; Tadashi Kanaya, Katsuta; Hiroaki Onishi, Ibaraki; Tsuneo Ichiishi; Akira Osaka, both of Hitachi, all of Japan

[73] Assignee: Hitachi, Ltd., Japan

[21] Appl. No.: 946,019

[22] Filed: Sep. 26, 1978

[30] Foreign Application Priority Data

Sep. 28, 1977 [JP] Japan .................. 52-115564

[51] Int. Cl.² ............................................. B65G 11/20
[52] U.S. Cl. ...................................... 193/40; 188/164
[58] Field of Search ...................... 193/40, 38, 39, 41; 310/12; 318/135; 198/690, 691; 188/164, 165

[56] References Cited

U.S. PATENT DOCUMENTS

| 3,882,981 | 5/1975 | Izomidate et al. ............. 193/40 |
| 4,088,213 | 5/1978 | Nakamura et al. ............. 193/40 |

Primary Examiner—Bruce H. Stoner, Jr.
Assistant Examiner—Gene A. Church
Attorney, Agent, or Firm—Craig and Antonelli

[57] ABSTRACT

A transporting apparatus for transporting cylindrical steel articles such as steel pipes by using inclined skid rails is arranged to have a magnetic braking device including electromagnetic coils for controlling the rolling speeds of the articles to be transported, wherein the electromagnetic coils are so disposed as to minimize a magnetic path for the magnetic fluxes developed by the electromagnetic coils and are also arranged in the shell type manner to prevent the electromagnetic coils from being externally damaged.

8 Claims, 11 Drawing Figures

APPARATUS FOR TRANSPORTING CYLINDRICAL STEEL ARTICLES

The present invention relates to an apparatus for transporting cylindrical steel articles, such as steel pipes, rods or the like and, more particularly, to an apparatus for the kind adapted to suppress noise produced due to collision between steel pipes or the like when these are transported thereon.

In a steel plant, when steel pipes produced are transported within a single production line, a roller conveyor is used for the medium diameter pipes and a chain conveyor with attachments is used for small diameter pipes. For some reasons such as the transportation of them from one to another production line, waiting time adjustments for preceding and succeeding working machines and inspection thereof, a plurality of skid rails are parallel arranged with some inclination to such an extent as to permit steel pipes to roll down on the skid rails. The steel pipes rolling down on the skid rails collide with each other with the result of the generation of great noises which may be transmitted over a long distance. In the case of small diameter pipes of light weight, the impact energy is small but the transporting speed thereof is higher. Noises produced by the rolling down of the steel pipes of the kind accordingly may continue substantially at the same level. This noise problem is serious in the light of noise nuisance and working environments, thus needing urgently proper countermeasures for the problem.

The present invention provides an improved structure of an apparatus for transporting cylindrical steel articles such as steel pipes, rods or the like which includes inclined skid rails and a magnetic device for magnetically control the rolling speed of such articles transported.

Figure 1A:
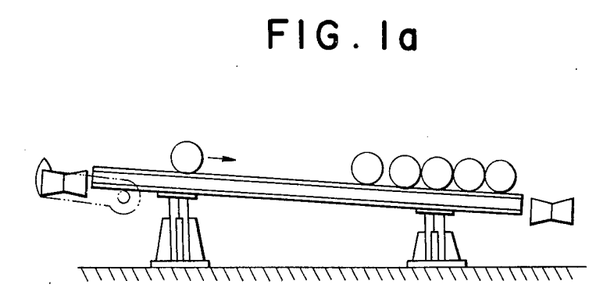
FIG. 1a schematically illustrates a state that steel pipes roll down on the inclined skid rails of a transporting apparatus.
Figure 1B:
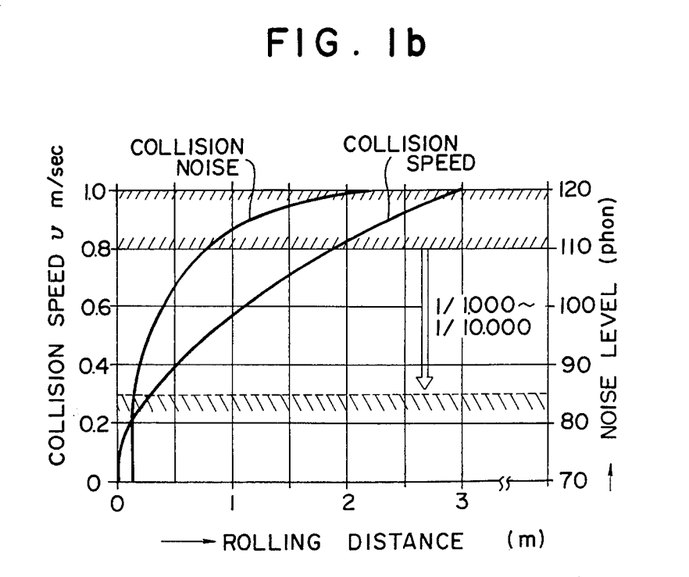

Other objects, features and advantages of the invention will be apparent from the following description taken in connection with the accompanying drawings, in which:

FIG. 1b shows a graph depicting variation of the rolling or collision speed of the rolling steel pipes, noise produced with respect to the rolling distance when the steel pipes are transported as in the state in FIG. 1a;

FIG. 1b illustrates a variation of the rolling or collision speed and noise level with respect the rolling distance when steel pipes roll down on the inclined skid rails by their self-weight on the transporting apparatus as shown in FIG. 1a.

As seen from FIG. 1b, noise can be reduced by reducing the rolling speed V because collision sound energy decreases at lower speeds. It is desired that collision noise be reduced from 110 to 120 dbA which is a noise level which may cause workers to be deafened to 85 dbA which is a noise level nearly the same as that of the background noise level in a typical workshop, then the collision speed must be reduced to less than 0.2 m/s whereby impact energy will be reduce to 1/1000 to 1/10000 of its usual value.

One form of an inclined skid rail transporting apparatus with a magnetic device for braking the rolling pipes is disclosed in U.S. Pat. No. 3,882,981 issued on May 13, 1975 to Izumida et al, entitled "Silencing means for Steel Pipe Production Line" and also U.S. Pat. No. 4,088,213 issued on May 9, 1978 to Nakamura et al, entitled "Apparatus for Transporting Cylindrical Steel Articles". The disclosed apparatuses are both of a type in which steel pipes roll down on inclined skid rails with the aid of gravity, and which is provided with a magnetic device for reducing the transporting speed of the steel pipes. The magnetic device includes a plurality of elongated magnetic core rods extending across the skid rails, and electromagnetic coils wound around the rods and disposed between adjacent skid rails. The rolling speed of the steel pipe is reduced by a braking force of magnetic flux developed by the electromagnetic coils.

The exciting method of the electromagnetic coil is classified into two; one uses a fixed DC current for exciting as disclosed in U.S. Pat. No. 3,882,981 and the other is a method in which the polarity of the DC current is alternately and periodically inverted as disclosed in U.S. Pat. No. 4,088,213. The braking force exerted onto the rolling pipes in either above method is given as a combination of (1) magnetic attraction force by the magnetic flux developed by the coil, (2) friction between the steel pipe and the skid rail which is increased by the magnetic attraction, and (3) a force by eddy current produced in the rolling steel pipe by the magnetic flux.

Figure 2:
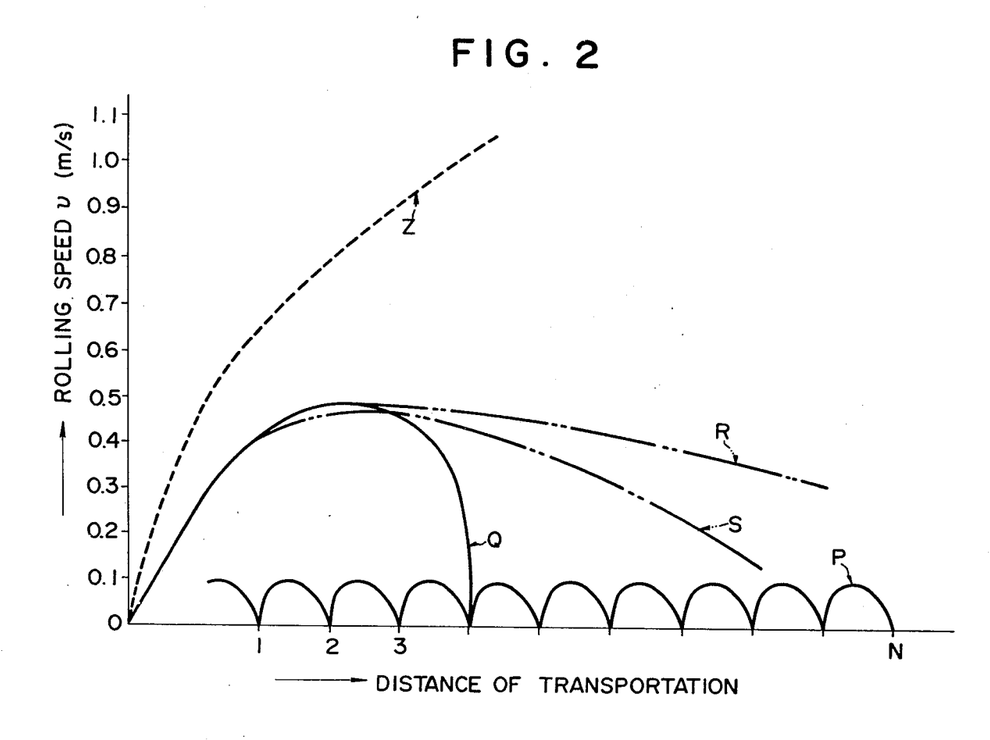
FIG. 2 is a graph depicting variation of the rolling speed with respect to the distance of transportation when steel pipes are rolling down on inclined skid rails of a transporting apparatus with a magnetic braking device, under various conditions.
Figure 3:
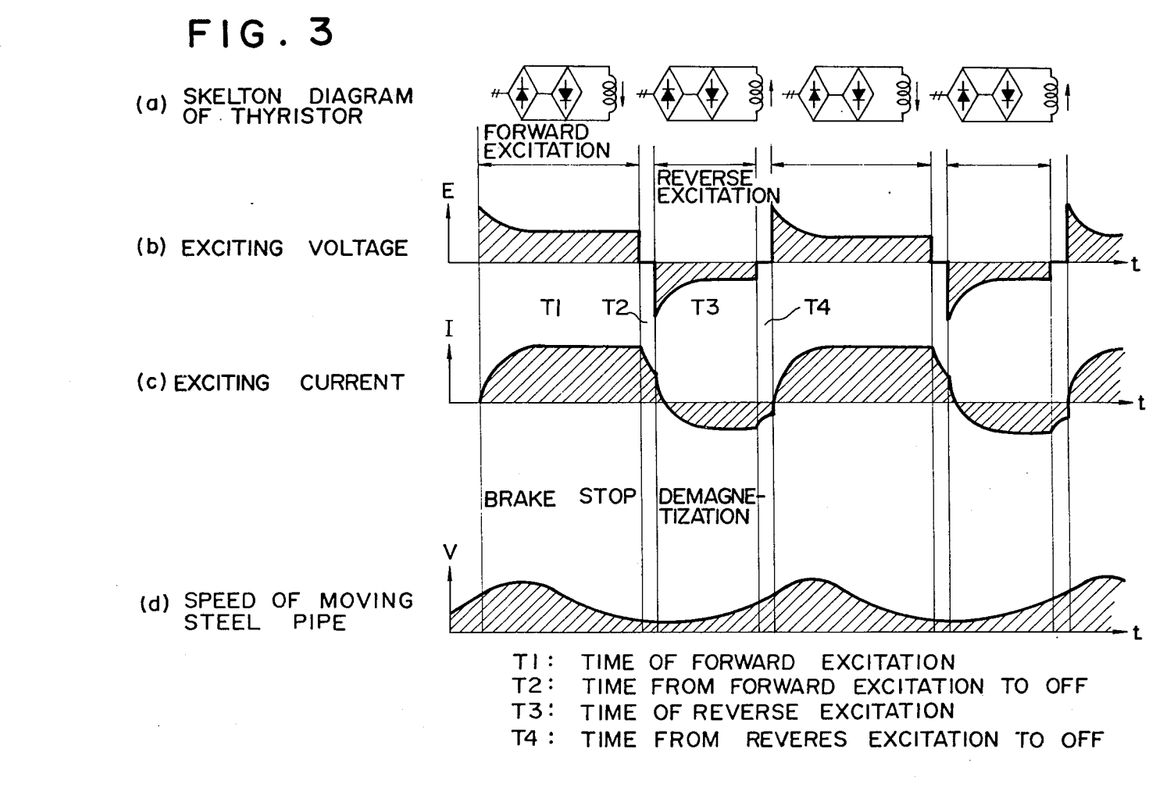
FIG. 3 schematically illustrates variation of the rolling speed under magnetic control by the magnetic braking device.

In the fixed DC current exciting method, the rolling speed of the pipe gradually increases due to its weight at the initial stage and then the magnetic braking force by the magnetic coils becomes effective to decelerate the increased rolling speed. This state of the rolling speed variation is shown in FIG. 2, by curves S and R. This method, however, is accompanied by troublesome work to adjust the magnitude of the exciting current in accordance with the size of the steel pipe. As a matter of course, when the exciting current is too small, insufficient deceleration is obtained while, when it is too large, the rolling pipe is greatly decelerated thereby to stop. On the other hand, in the method by periodically inverting the polarity of the DC current, the rolling speed of the steel pipe varies, as shown in FIG. 3, with periodical changes of the polarity. In this case, the reverse excitation is generally about 50% of the forward excitation so that the residual magnetism existing when the forward excitation is turned off is cancelled. Generally, the forward excitation time is usually 1 to 3 seconds and the reverse excitation time is 0.5 to 1.5 seconds. A double converter thyristor switch may be used to facilitate alternately forward and reverse excitation, FIGS. 3b and 3c show the variation of the exciting voltage and current flowing through a magnetic coil during forward excitation T1 and reverse excitation T3. During the forward excitation, a pipe is attracted to and therefore braked by the magnetized skid rails. On the other hand, during the reverse excitation, the skid rails are demagnetized and thus the pipe is allowed to run by gravity down on the skid rails. The process of forward and reverse excitations, followed by braking and releasing of a pipe, is repeated until the pipe reaches the end of the skid. In this manner, the rolling steel pipes are decelerated with application of the forward excitation and again accelerated with application of the reverse excitation. If the magnetic force by the forward excitation is sufficiently increased, the rolling speed of the steel pipe is reduced to zero, that is to say, the rolling of the steel pipe stops. Thus, the pipe is transported in the so-called "pitch transfer mode" as illustrated in FIG. 2, by a curve P.

In the transporting apparatus disclosed in the above-mentioned U.S. patents, a plurality of parallel and spaced magnetic core rods are disposed across the inclined skid rails extending parallel and longitudinally and the electromagnetic coils are wound around the core rods, while each being disposed between adjacent skid rails. The magnetic path of the magnetic flux produced by each electromagnetic coil is provided by a part of the associated magnetic core rod extending between the adjacent skid rails, skid rails, and the steel pipe rolling on the skid rails. Accordingly, the magnetic path is relatively long so that a large electric power is required to provide a necessary brake force. Additionally, the electromagnetic coils are exposed between the skid rails, thus being readily subjected to external damages.

Figure 4:
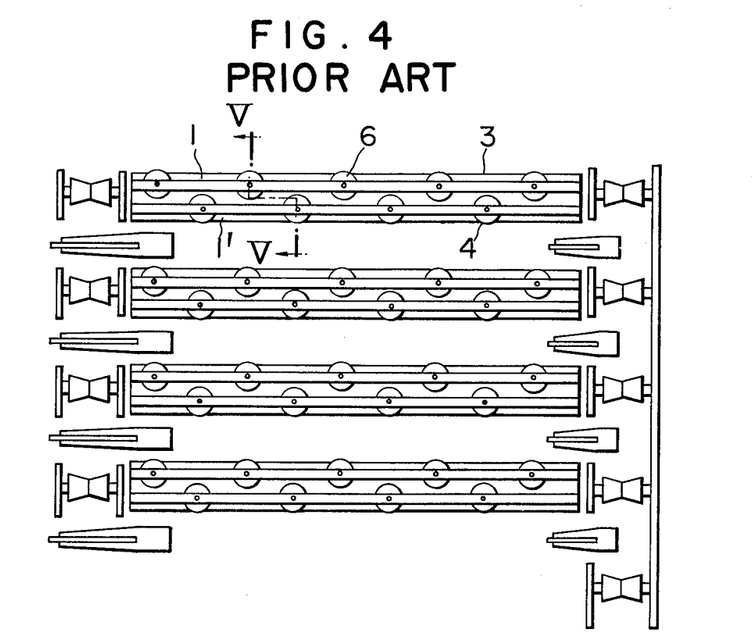
FIG. 4 shows a plan view of a conventional transporting apparatus.
Figure 5:
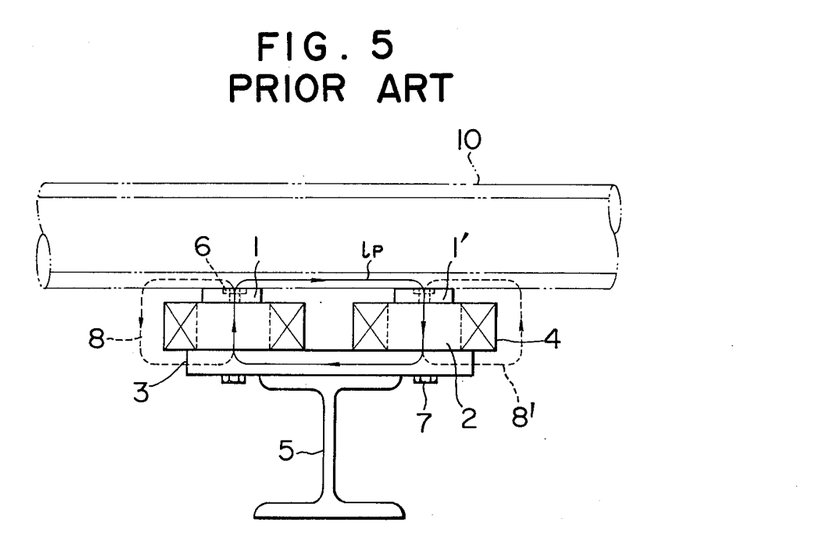
FIG. 5 shows a cross sectional view taken on line V—V in FIG. 4.

Another example of the transporting apparatus using device inclined skid rails with a magnetic braking device is disclosed in Japanese Patent Application No. 34450/77. The construction of the disclosed transporting apparatus is illustrated in FIGS. 4 and 5. In the figures, reference numerals 1 and 1' designate inclined skid rails which support a steel pipe 10 and serve as magnetic rails through which a magnetic force is transferred to the steel pipe. The skid rails are fixed by bolts 6 to iron cores 2. The iron cores 2 are fixed by bolts 7 onto a yoke 3 mounted on a supporting member 5. Exciting coils 4 are wound around the iron cores 2, respectively. In this transporting apparatus, the magnetic path for each coil is relatively shortened but it is accompanied by leakage of a part of magnetic flux as indicated by 8 and 8' in FIG. 5. Therefore, this apparatus is disadvantageous in magnetic efficiency and power consumption. Further, the coil arrangement is of the core type such that the coils are exposed to outside. Thus, this structure is also disadvantageous in that the coils are readily subjected to external damages.

Accordingly, a principal object of the present invention is to provide an apparatus for transporting cylindrical steel articles having magnetic braking means in which the magnetic path of the magnetic flux developed by each coil of a magnetic braking apparatus is as short as possible and the coils are disposed in shell type so as to prevent the coils from being externally damaged.

Another object of the invention is to provide a transporting apparatus of the just-mentioned type which is simple in construction and easy in its assembling.

Another object of the invention is to provide a transporting apparatus of the just-mentioned type with resilient cushion means for increasing the braking force which are each provided between adjacent skid rails.

Figure 6:
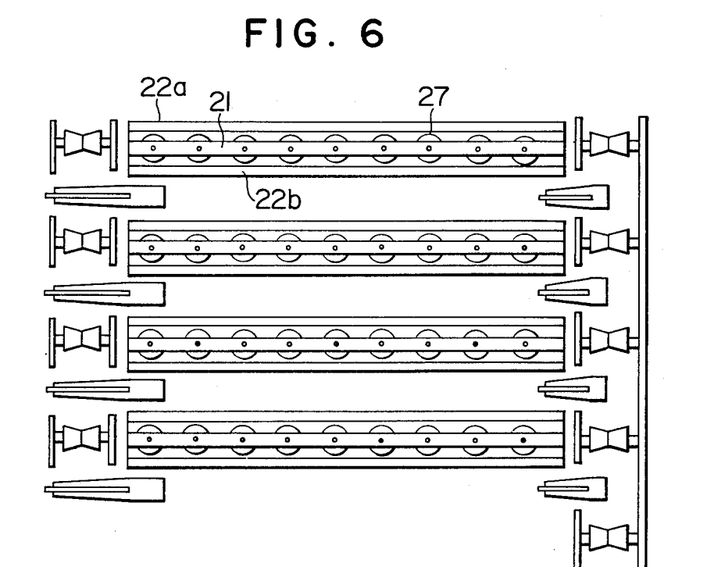
FIGS. 6 to 8 show a plan view of the whole of a transporting apparatus according to the invention, a plan view of a part of the apparatus shown in FIG. 6 and a cross sectional view of a part of the same; respectively.

Now referring to FIG. 6, there is shown an apparatus for transporting cylindrical steel articles according to the invention. As shown, the transporting apparatus includes four sets of skid rail assemblies. It is obvious that the number of the sets of the skid rail assemblies may be properly determined depending on the range in length of the steel articles to be transported. Each skid rail assembly includes three skid rails 21, 22a and 22b which are used to support the steel pipes and form a part of the magnetic path for the magnetic flux developed by the electromagnetic coils 27.

Figure 7:
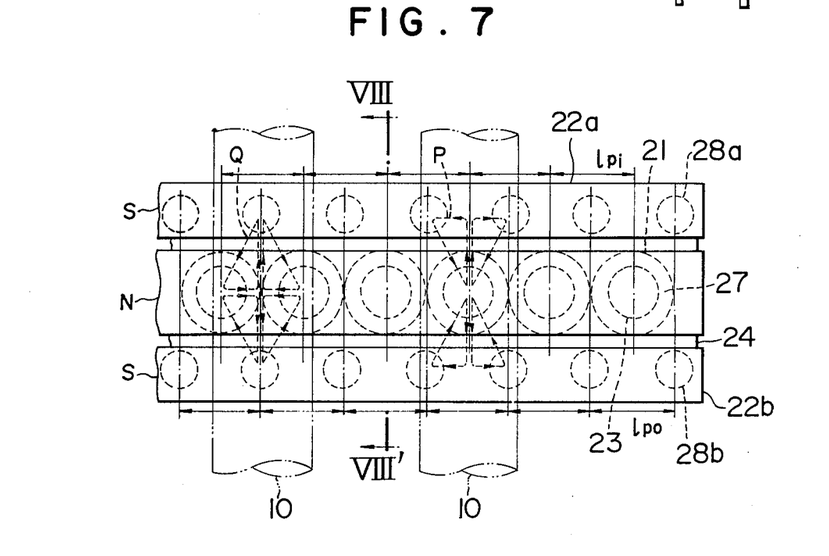
Figure 8:
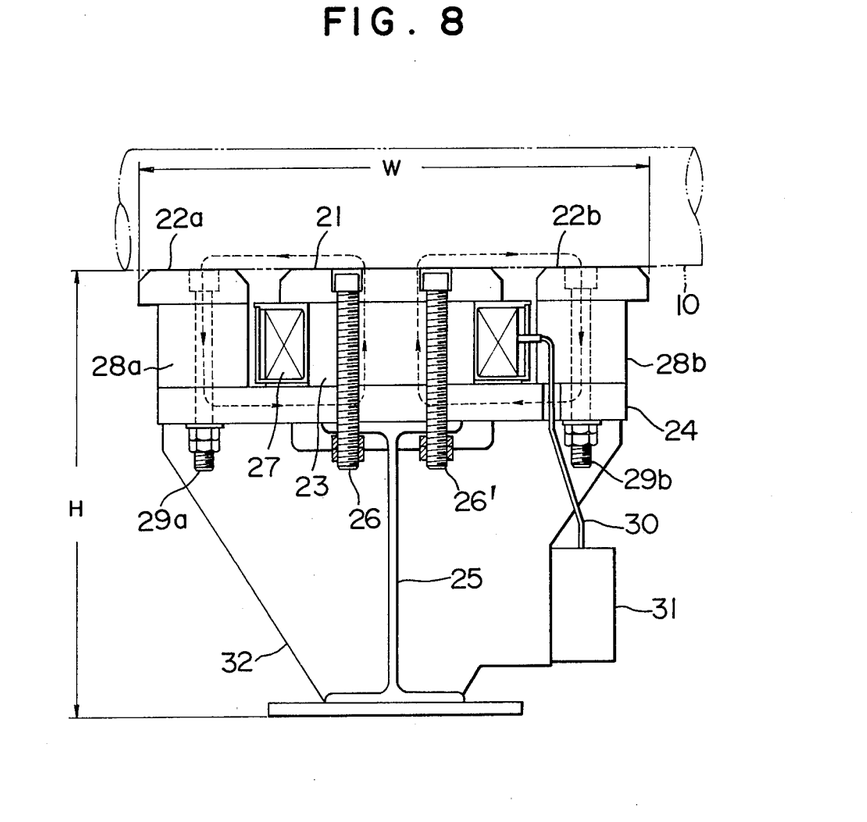

FIG. 7 is an enlarged view of a part of the structure in FIG. 6 and FIG. 8 shows a cross sectional view taken along line VIII—VIII' in FIG. 7.

As best shown in FIG. 8, skid rails 21, 22a and 22b, together with iron cores 23, 28a and 28b, are fixed onto a steel plate 24 by means of screw bolts 26, 26', 29a and 29b. The steel plate 24, together with the iron core 23, are fixed to a support member 25 of shaped steel structure extending in parallel with the skid rails by means of the screw bolts 26 and 26'. Reference numeral 32 designates a rib for enforcing the supporting member 25. Suitable number of ribs may be used to sufficiently strengthen the support member to support the steel pipes 10, skid rails, steel plates, magnetic cores, magnetic coils and the like. A half of the magnetic flux developed by the magnetic coil 27 passes through a magnetic path indicated by dotted line including the iron core 23, skid rail 21, steel pipe 10, skid rail 22a, iron core 28a and steel plate 24. Another half of the magnetic flux passes through a magnetic path indicated by dotted line which is disposed symmetrically with the above-mentioned magnetic path. Thus, the electromagnetic coil and the iron cores are arranged in the socalled shell type. The skid rail 21 and the core 23 serve as an inner pole and an inner iron core, respectively, and the skid rail 22a and the iron core 28a as an outer pole and an outer iron core respectively. The steel plate 24 serves as a yoke. Similarly, the skid rail 22b and a core 28b serve as an outer pole and an outer iron core respectively. The inner pole 21 and the outer poles 22a and 22b are so arranged that the upper surfaces of them substantially flush with each other. A lead wire 30 of the magnetic coil 27 extends through a wiring duct 31 supporting by one side of the supporting rib to be connected to a control device (not shown).

As shown in FIG. 7, the inner iron cores 23 are disposed in a row under the inner pole 21 and spaced with the same pitch $l_{pi}$. The outer iron cores 28a and 28b disposed under the outer poles 22a and 22b are each disposed to be aligned with the center line of the space between the two adjacent inner poles so that the pitch between two adjacent outer iron cores is also $l_{po}$. The inner iron core 23 is wound by the exciting coil 27 but the outer iron cores 28a and 28b is wound by no coil. Assume now that the exciting coil 27 is energized such that the magnetic rail 21 as the inner pole is magnetized in N pole and the magnetic rails 22a and 22b as the outer poles are magnetized in S pole. On the assumption, (1) When the steel pipe 10 is substantially right above the center of the inner pole 23, four magnetic closed loops P are symmetrically formed for the magnetic fluxes of one exciting coil through inner pole iron core 23, inner pole magnetic rail 21, steel pipe 10, outer pole magnetic rail 22a or 22b, outer pole iron core 28a or 28b and yoke 24. The attraction forces by the magnetic fluxes developed through the closed loops P serve as a drag against the movement of the steel pipe 10 from the position in the longitudinal direction of the skid rail.

(2) When the steel pipe 10 is located along the center line of the outer iron cores 28a and 28b, four symmetrical magnetic closed loops Q are developed through the steel pipe for the magnetic fluxes of two exciting coils, each loop providing the same magnetic path length as the case (1). The attraction forces by the fluxes also serve as a drag against the movement of the steel pipe 10 from the position in the longitudinal direction of the skid rail.

As seen from the above, both the cases (1) and (2) each have four magnetic closed loops having equal lengths. In the case (1) where the steel pipe 10 is above the inner pole iron core 23, four magnetic closed loops are formed by one inner pole iron core, one exciting coil and four outer pole iron cores. In the case (2) where the steel pipe 10 is above the outer pole iron cores 28a and 28b, four magnetic closed loops are formed by two inner pole iron cores, two exciting coils and two outer pole iron cores. The comparison between these two cases shows that the magnetic path for the whole effective magnetic flux is formed in each case by one inner pole iron core, a steel pipe, two outer pole iron cores and a yoke, and thus the effective magnetic paths of both the cases are substantially equal to each other.

In other words, the zig-zag arrangement of the inner pole iron core 23 and the outer pole iron cores 28a and 28b provides an effective magnetic path which is relatively short and substantially constant regardless of the position of the steel pipe.

Figure 10:
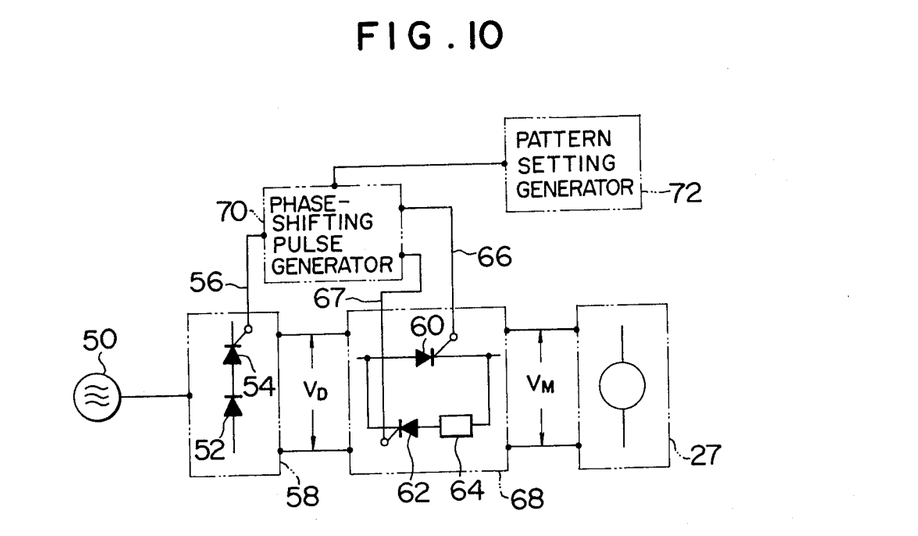
FIG. 10 shows a block diagram of an exciting control circuit.

The fixed polarity DC excitation as previously mentioned may be used in the present invention. In the arrangement of FIG. 6, for example, a constant DC current may be applied to the coils so that the inner poles are always N poles and the yoke an S pole. However, it is preferred to change the polarity of the DC current alternately and periodically. The exciting control circuit may be used in the same manner as described in detail in the aforementioned U.S. Pat. No. 4,088,213. The basic circuit for the magnetic excitation is shown in FIG. 10. In the figure, an AC power supply 50 is coupled with a rectifier 58 including a diode 52 and a thyristor 54. The DC voltage $V_D$ rectified by the rectifier 58 is periodically changed in its polarities by a polarity change-over switch 68 and the polarity-controlled DC voltage $V_M$ is applied to the magnetic coil 27. The control electrodes of the thyristors 60 and 62 in the polarity change-over switch 68 and the thyristor 54 of the rectifier 58 are connected to a phase-shifting pulse generator 70 which control the conductivity of each of the thyristors. The thyristor 54 is controlled so as to adjust the amplitude of the rectified DC voltage $V_D$. The thyristors 60 and 62 are controlled so as to be rendered alternately conductive. When the thyristor 60 is turned on, the forward excitation is effective and when the thyristor 60 is turned on, the reverse excitation is effective. A resistor 64 connected in series with the thyristor 62 restricts the reverse excitation current to be approximately 50% of the forward excitation. The ratio of the reverse excitation to the forward excitation may be adjusted selectively by adjusting the resistance of the resistor 64. A pattern setting generator 72 is used to control the timing of the forward and reverse excitations, that is, to set the time intervals T1, T2, T3 and T4 in FIG. 3. The pulse generator 70 produces control pulses, which are applied to the thyristors, at the timing controlled by the pattern setting generator 72. The further detailed construction of the circuits is described in U.S. Pat. No. 4,008,213 and, if necessary, it should be referred to.

The physical dimensions of each skid rail assembly should be determined by the size and the weight of the pipe to be transported. Typical dimensions as shown in Table I are given only for reference.

Table I

| Type | MR8-E₂B | MR8-E₂C | MR15-E₄A | MR15-E₄C | MR15-E₅A | MR15-E₅C | MR15-E₆A | MR15-E₆C |
|---|---|---|---|---|---|---|---|---|
| Width of skid rail (mm) | 255 | 255 | 400 | 400 | 500 | 500 | 600 | 600 |
| Pitch of Magnetic Coils $l_{pi}$ (mm) | 375 | 250 | 500 | 250 | 500 | 250 | 500 | 250 |
| Diameter of Core Inner Core (mm) | | 80 | | | | 150 | | |
| Outer Core | | 60 | | 80 | | 110 | | 110 |
| Magnetic Coil Rating | DC 150V, 0.2A | | | | DC 220V, 0.59A | | | |
| Unit Weight Kg/unit/m | 115 | 120 | 305 | 350 | 415 | 455 | 485 | 530 |
| Unit Electric Power Kw/unit/m | 0.07 | 0.09 | 0.2 | 0.4 | 0.2 | 0.4 | 0.2 | 0.4 |
| Width of Skid Unit L (mm) | | 310 | | 460 | | 560 | | 660 |
| Unit Brake Energy $E_M$ (N-m/Unit) | 1.59 | 2.29 | 8.15 | 11.5 | 16.5 | 25.0 | 37.3 | 54.2 |
| Steel Pipe Size | | Small diameter Pipe (But Welding) | E.R.W.(~7") | | E.R.W. (4~20") Seamless (4~16") | | Seamless (Heavy size) U.C.E. | |

Figure 9:
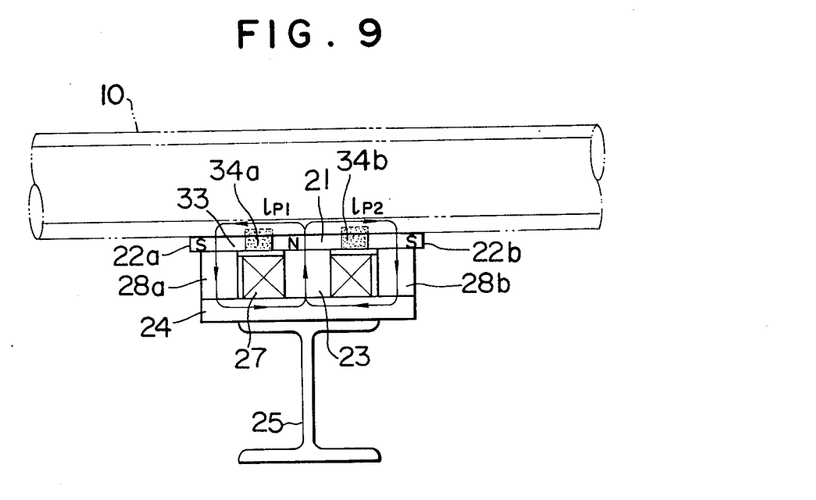
FIG. 9 shows a structure of another embodiment of the transporting apparatus according to the invention.

Referring now to FIG. 9, there is illustrated another embodiment of the present invention. In this embodiment, the basic construction of the skid rails 21, 22a and 22b, magnet cores 23, 28a and 28b, steel plate 24 and a supporting member 25 is substantially the same as the embodiment of FIGS. 6, 7 and 8. This embodiment includes additionally mechanical braking means including resilient cushions 34a and 34b disposed between the skid rails 21 and 22a and between the skid rails 21 and 22b. The resilient cushions 34a and 34b may be made of foamable polyurethane material and seated on a nonmagnetic plate 33, which is made of aluminum, stainless steel or the like and fixed to the undersides of the skid rails 21, 22a and 22b, in such a manner that the top surface of each cushion is 2 to 5 mm higher than the top surfaces of the skid rails. When the steel pipe 10 rolls down, the resilient cushions deform to absorb a part of rolling energy of the pipe. Thus the cushions are effective, in cooperation with the magnetic braking device to increase the braking force applied to the rolling pipes.

As seen from the foregoing, it will be understood that the magnetic path length for the magnetic flux developed by the magnetic coils is relatively short irrespective of the position of the steel pipe and the leakage flux is reduced about 20 to 30% compared to that of the conventional core type arrangement. As a result, the magnetic efficiency is remarkably improved and power consumption is saved approximately 50%. The power saving effect is further improved when the resilient cushions are used to increase the braking effects. Furthermore, since the magnetic coil arrangement is of the shell type, the coils are hardly subjected to external damages.

Although the specific embodiments of the present invention are described, it will be obvious to the skilled persons in the art that the embodiments may be modified without deviating from the scope of the invention.

What is claimed is:

1. An apparatus for transporting cylindrical steel articles comprising at least one skid rail unit which comprises: an inner pole section including at least one skid rail extending longitudinally, a pair of outer pole sections each including at least one skid rail which extends longitudinally and is spaced from and substantially parallel to the skid rail of said inner pole section, the top sufaces of the skid rail of said inner pole and the skid rails of said outer pole sections defining an inclined supporting plane on which the articles to be transported roll down; at least one inner pole iron core magnetically coupled with said inner pole section; an electromagnetic coil wound around each of the inner pole iron cores; at least one outer pole iron core magnetically coupled with each of said outer pole sections; and a yoke section magnetically coupling all the inner pole iron cores of said inner pole section and all the outer pole iron cores of said outer pole sections.

2. A transporting apparatus according to claim 1, wherein said inner pole section includes a plurality of inner pole iron cores arranged with substantially equal spaces along the skid rails, each of said outer pole sections includes a plurality of outer pole iron cores arranged with substantially equal spaces, said outer pole iron cores in said each outer pole section being disposed to respectively align substantially with the center lines between every adjacent inner pole iron cores of said inner pole section.

3. A transporting apparatus according to claim 1 or 2, further comprising supporting means including a supporting rigid frame extending substantially parallel to said skid rails and a supporting flange, and wherein said yoke section is a steel place coextending with said skid rails and mounted on said supporting frame, said skid rails and said iron cores being screwed to said steel plate.

4. A transporting apparatus according to claim 1 or 2, further comprising exciting means for exciting said magnetic coils.

5. A transporting apparatus according to claim 4, wherein said exciting means comprises a DC power supply for supplying said magnetic coils with DC excitation and switching means connected between said DC power supply and said magnetic coils for switching the polarity of said DC excitation between forward and reverse direction, alternately.

6. A transporting apparatus according to claim 1 or 2, further comprising resilient cushion means including an elongated resilient member fitted between said skid rail of said inner pole section and said skid rail of each of said outer pole sections, said resilient member having a top surface projecting over said inclined supporting plane.

7. A transporting apparatus according to claim 6, further comprising exciting means for exciting said magnetic coils.

8. A transporting apparatus according to claim 7, wherein said exciting means comprises a DC power supply for supplying said magnetic coils with DC excitation and switching means connected between said DC power supply and said magnetic coils for switching the polarity of said DC excitation between forward and reverse direction, alternately.

* * * * *